Sept. 24, 1963 H. F. TRAEDER 3,104,553
POSITIONALLY STABLE MECHANICAL ASSEMBLY
Filed July 8, 1960
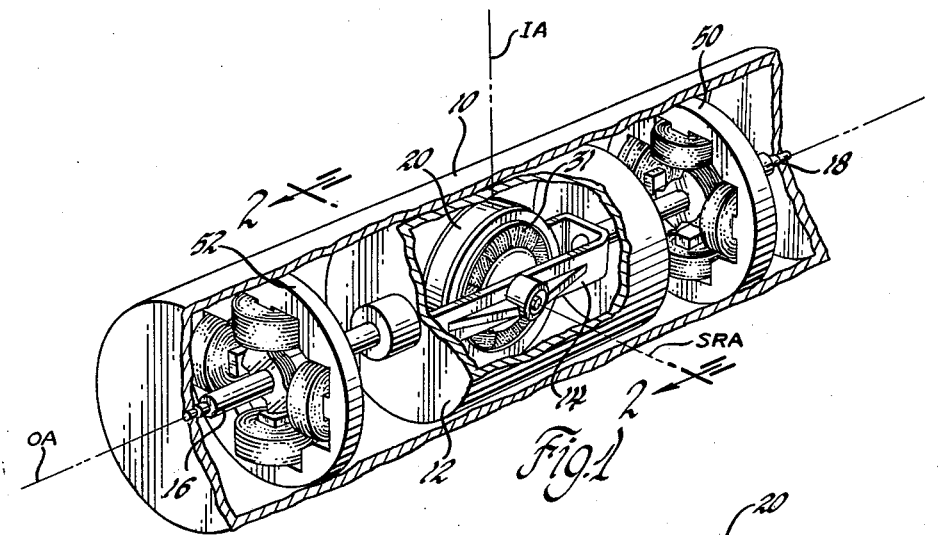
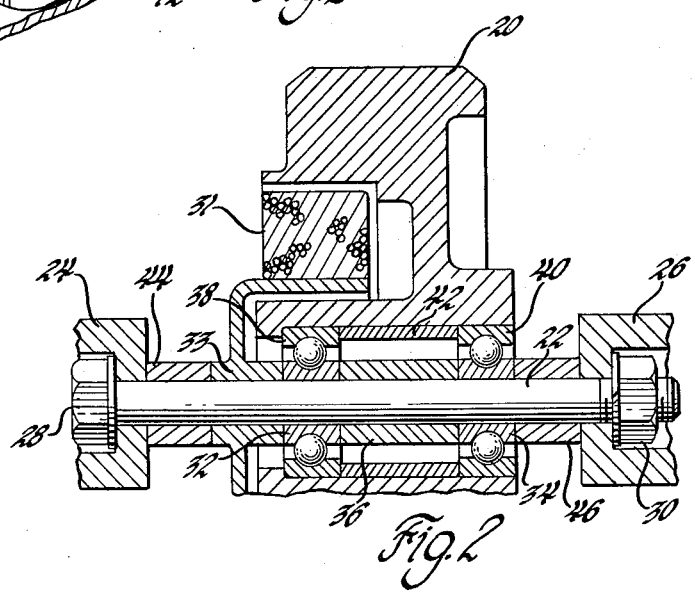
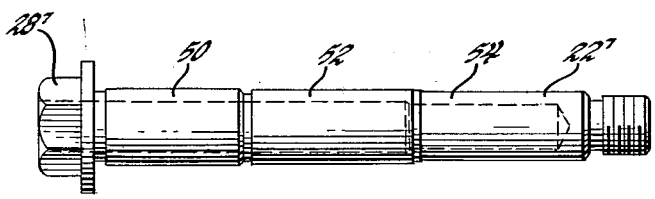
INVENTOR.
Howard F. Traeder
BY
Paul J. Ethington
ATTORNEY United States Patent Office 3,104,553
Patented Sept. 24, 1963

3,104,553
POSITIONALLY STABLE MECHANICAL ASSEMBLY
Howard F. Traeder, Milwaukee, Wis., assignor to General Motors Corporation, Detroit, Mich., a corporation of Delaware
Filed July 8, 1960, Ser. No. 41,554
5 Claims. (Cl. 74—5)

This invention relates to mechanical systems and more particularly to an arrangement for preventing repositioning or mass shift of the components in an assembly due to temperature changes.

In mechanical systems where two or more serially arranged members are maintained in compression by a tension member, it has been found that the members change relative positions when the assembly is subjected to temperature changes. In certain systems, it is desirable to maintain a predetermined positional relationship among the members; for example, in gyroscopes with a high degree of accuracy, a change of positional relationship may cause mass unbalance about the output axis which results in a significant amount of "drift torque." Conventionally, such gyroscopes include a heating system and the components on the rotor shaft are designed and assembled, suitably with interference fits, to provide mass balance about the output axis at a rated operating temperature. This assembly performs satisfactorily if it is continuously held at the operating temperature but if it is cooled and reheated to the operating temperature, the assembly develops a mass unbalance. The cause of this unbalance is relative displacement of components which is attributed to mechanical hysteresis developed as a result of differential thermal expansion and contraction together with slippage of the various members against frictional forces.

In accordance with this invention, positional stability is achieved in such mechanical systems by correlating the temperature coefficients of linear expansion with the coefficients of elastic deformation. This can be accomplished without relying on frictional forces between the members. In particular, a system including two or more compression members disposed serially between a pair of abutments on a tension member is stabilized by designing the system so that the ratio of the difference between the temperature coefficients of linear expansion of the compression member and the tension member to the summation of the coefficients of elastic deformation of the two members is the same at any cross-section through the members. If all of the compression members have substantially the same temperature coefficients of expansion then stabilization is accomplished if the summation of the coefficients of elastic deformation of the tension and compression members is the same value at any cross-section through any compression member and the tension member.

A more complete understanding of this invention may be had from the detailed description which follows taken with the accompanying drawings in which:

FIGURE 1 is a pictorial view of a gyroscope with portions cut away to reveal the interior structure in which the invention is embodied;

FIGURE 2 is a sectional view taken on lines 2—2 of FIGURE 1; and

FIGURE 3 shows a shaft construction for use with this invention.

Referring now to the drawings, there is shown an illustrative embodiment of the invention in a gyroscope rotor shaft arranged to prevent development of mass unbalance about the gyroscope output axis due to temperature change. The gyroscope illustrated is a single degree of freedom integrating gyroscope of the type commonly used for stabilization in navigation systems. The gyroscope comprises a casing 10 which contains a cylindrical float 12 enclosing a gimbal 14 with trunnions 16 and 18 affixed thereto. The trunnions are journaled in the casing 10 for rotation about the gyroscope output axis OA and the casing is filled with a flotation liquid to provide buoyant support and viscous damping for the float 12 in a well known manner. The rotor 20 of the gyroscope is disposed within the float 12 and mounted on a shaft 22 which extends through bosses 24 and 26 on the gimbal 14 and which is provided with a fixed abutment or head 28 at one end and an adjustable abutment or nut 30 at the other end. The rotor shaft 22 defines the spin reference axis SRA of the gyroscope. The rotor of the gyroscope is energized by a stator 31 which is fixedly mounted on the shaft by a hub 33.

The rotor is rotatably mounted on the shaft by a pair of ball bearings with inner races 32 and 34 which are mounted on the shaft and separated by a spacer 36 and with outer races 38 and 40 disposed within the rotor hub with interference fits and separated by a spacer 42. A pair of end spacers 44 and 46 are disposed on the shaft adjacent the bosses 24 and 26, respectively. The nut 30 is tightened to a predetermined torque causing the shaft 22 to become a tension member and causing the bearing inner races 32 and 34, the stator hub 33, and the spacers 36, 44 and 46 to become compression members. The stiffness of the gimbal is such that it will exert only a negligible resisting force to the tightening of the nut 30.

A signal generator or microsyn 50 has its stator mounted on the casing 10 and its rotor mounted on the trunnion 18 for rotation therewith to develop an output signal voltage corresponding in phase and amplitude to the direction and magnitude of angular displacement of the gimbal or float assembly. A torque generator or microsyn 52 is adapted to exert a torque on the trunnion 16 in accordance with energizing currents supplied to the microsyn windings to provide compensation for drift torques about the output axis and to provide desired input torques to the gyroscope. The gyroscope just described responds to angular rates about the input axis IA, which is mutually perpendicular to the spin reference axis SRA and the output axis OA, to develop an angular displacement corresponding thereto about the output axis so that the signal voltage developed by the microsyn 50 corresponds to the time integral of the input angular rate.

In such a gyroscope, errors due to drift torque are introduced by any mass unbalance about the output axis OA, resulting from mass shift or relative displacement of the components mounted on the rotor shaft 22. It has been found that any temperature change from the operating value causes relative displacement of the components on the rotor shaft due to differential expansion and contraction. Even when the temperature is restored to the operating value, there is a resulting relative displacement if the compression members are in frictional engagement with the tension member, such as may be obtained by interference fits, due to mechanical hysteresis developed from the combination of differential expansion and contraction together with slippage of the members against frictional forces.

In accordance with this invention, relative displacement of the components is avoided by an assembly in which the ratio of the difference in the temperature coefficients of linear expansion of the compression member and the tension member to the summation of the coefficients of elastic deformation of the two members is the same at any cross section through the tension member. To prevent relative displacement between a compression member of length L and a corresponding section of the tension member requires that the change in length $\Delta L_c$ in the compression member, due to temperature change and load change, must be equal to the change in length $\Delta L_t$ in the corresponding length of the tension member. With the assembly at an initial temperature T, and assuming that the stiffness of the gimbal is negligibly small, the compression members and tension members are subjected to the same load P. If the assembly is subjected to a temperature change $\Delta T$, the resulting change in length, for the compression member and tension member respectively, may be expressed as follows:

$$\Delta L_c = L(a_c)(\Delta T) - \frac{\Delta P(L)}{A_c E_c} \quad (1)$$

and $$\Delta L_t = L(a_t)(\Delta T) + \frac{\Delta P(L)}{A_t E_t} \quad (2)$$

wherein the subscripts $c$ and $t$ refer to the compression member and the tension member, respectively, and where:

$a$ = temperature coefficient of linear expansion,
$\Delta P$ = the change in load occasioned by the change in temperature,
$A$ = cross-sectional area,
$E$ = Young's modulus of elasticity.

To avoid any relative displacement of the two members these changes of length must be equal to each other:

$$L(a_c)(\Delta T) - \frac{\Delta P(L)}{A_c E_c} = L(a_t)(\Delta T) + \frac{\Delta P(L)}{A_t E_t} \quad (3)$$

The quantity $$\frac{1}{AE}$$

is the coefficient of elastic deformation D which may be substituted in Equation 3 to obtain, after suitable rearrangement, the change in load on the members under consideration as:

$$\Delta P = \frac{(a_c - a_t)\Delta T}{D_c + D_t} \quad (4)$$

In order to eliminate any unbalanced forces on the compression members which would produce relative displacement, the change in load $\Delta P$ must be the same for all compression members. This relation may be expressed as $$\Delta P_1 = \Delta P_2 \quad (5)$$

$$\frac{(a_{c1} - a_{t1})}{D_{c1} + D_{t1}} = \frac{(a_{c2} - a_{t2})}{D_{c2} + D_{t2}} \quad (6)$$

where, the subscript 1 refers to any cross-section through a first compression member and the subscript 2 refers to any cross-section through a second compression member. Equation 6 shows that unbalanced forces are eliminated when the ratio of the difference in the temperature coefficients of linear expansion for one compression member and the tension member to the summation of the coefficients of elastic deformation of the two members is equal to the ratio between the same quantities for any other compression member and the tension member. This requirement may be met, as shown in the embodiment of FIGURE 2, with a tension member or shaft 22 of uniform diameter throughout its length. The compression members, i.e. hub 33, inner races 32 and 34, and spacers 44, 46, and 36, are of materials selected so that the temperature coefficients of linear expansion, Young's modulus, and cross-sectional area, are correlated with these properties of the shaft in accordance with Equation 6.

The compression members may be selected to have the same temperature coefficients so that $$a_{c1} = a_{c2} \quad (7)$$

and with a shaft of the same material throughout:

$$a_{t1} = a_{t2} \quad (8)$$

so that Equation 6 reduces to:

$$D_{c1} + D_{t1} = D_{c2} + D_{t2} \quad (9)$$

In this case, the unbalanced forces which would produce relative displacement are eliminated by making the sum of the coefficients of elastic deformation of the tension member and the compression member the same value at any point along the shaft, as expressed in Equation 9.

In certain applications, to enable the use of certain materials and to facilitate assembly of the compression members with interference fits, a shaft with sections of different diameters may be employed. As shown in FIGURE 3, there is provided a stepped shaft 22' with a stepped exterior surface and a bore with sections of different diameters. The shaft 22' has a head 28' and progressively smaller shaft sections 50, 52, and 54. The shaft is hollow throughout its effective length with a bore of such diameter through the different sections so that the shaft has a uniform cross-sectional area.

Although the description of this invention has been given with respect to a particular embodiment, it is not to be construed in a limiting sense. Numerous modifications and variations within the spirit and scope of the invention will now occur to those skilled in the art. For a definition of the invention, reference is made to the appended claims.

I claim:
1. A gyroscope adapted for operation over a range of temperatures comprising; a support member, a gimbal having trunnions supported by the support member for rotation about an output axis, a rotor shaft extending between opposite sides of said gimbal and extending transversely of said output axis and defining a spin reference axis, at least one bearing means having an inner race member concentrically mounted on the shaft, a gyroscope rotor mounted on the bearing means for rotation about the spin reference axis, at least one spacer sleeve member concentrically mounted on the shaft in alignment with the race member, said shaft being secured non-rotatably at its opposite ends to the gimbal and being under tension against the reaction of said members, said members being positioned on said shaft so that mass balance about said output axis is achieved at any given temperature, the ratio of the difference between the temperature coefficient of linear expansion of any of said members and the shaft to the summation of the coefficients of elastic deformation of the member and shaft being the same at any cross-section through the shaft and any one of said members whereby the change in load due to temperature change is the same in all of said members so that there is no axial mass shift along the spin reference axis.

2. A mechanical assembly including a tension member with a pair of axially spaced abutments thereon, at least two compression members disposed in series between said abutments and subject to compressional stress imposed by tensional stress in the tension member, the assembly being characterized in that the ratio of the difference between the temperature coefficients of linear expansion of the compression member and the tension member to the summation of the coefficients of elastic deformation of the compression and tension members is the same at any cross-section through the members whereby the change in load due to temperature change is the same in all compression members so that there is no axial mass shift in the assembly.

3. A mechanical assembly including a tension member with a pair of axially spaced abutments thereon, at least two compression members disposed in series between said abutments and subject to compressional stress imposed by tensional stress in the tension member, the assembly being characterized in that said compression members have substantially the same temperature coefficients of expansion and the summation of the coefficient of elastic deformation of the tension member at any cross-section and the coefficient of elastic deformation of the compression member at said cross-section is equal to the summation of said coefficients at any other cross-section whereby the axial mass shift due to temperature changes of said assembly is minimized.

4. A mechanical assembly including a shaft with a fixed abutment and an adjustable abutment thereon, at least two sleeve members disposed in alignment on the shaft between the abutments, said adjustable abutment being positioned so that the sleeves are held in compression against the reaction of the fixed abutment, the temperature coefficients of linear expansion and the coefficients of elastic deformation of the shaft and sleeve members being related in accordance with $$\frac{a_{c1}-a_{t1}}{D_{c1}+D_{t1}}=\frac{a_{c2}-a_{t2}}{D_{c2}+D_{t2}}$$

wherein, $a_{c1}$ and $a_{t1}$ are the temperature coefficients of linear expansion of the sleeve and shaft members, respectively, at a first cross-section through the members and $D_{c1}$ and $D_{t1}$ are the coefficients of elastic deformation of the sleeve and shaft members, respectively, at the same cross-section, and wherein $a_{c2}$ and $a_{t2}$ are the temperature coefficients of linear expansion of the sleeve and shaft members, respectively, at any other cross-section, and $D_{c2}$ and $D_{t2}$ are the coefficients of elastic deformation of the sleeve and shaft members, respectively, at said any other cross-section.

5. The combination defined in claim 4 wherein the shaft member has at least two sections of different diameters, each section accommodating one of said sleeve members, and wherein said shaft defines a bore with different diameters through said sections to obtain the coefficients of elastic deformation required to satisfy the relation defined in claim 4.

References Cited in the file of this patent

UNITED STATES PATENTS

| | | |
|---|---|---|
| 2,649,808 | Slater et al. | Aug. 25, 1953 |
| 2,771,778 | Ryberg | Nov. 27, 1956 |
| 2,829,523 | Fischer | Apr. 8, 1958 |
| 2,898,765 | Atkinson et al. | Aug. 11, 1959 |